(No Model.)

D. A. JOHNSON.
SPRING WASHER.

No. 330,492.   Patented Nov. 17, 1885.

Witnesses:
H. N. Low
E. Welleaseh

Inventor:
Daniel A. Johnson
by M. Bailey,
his atty.

N. PETERS, Photo-Lithographer, Washington, D. C.

UNITED STATES PATENT OFFICE.

DANIEL A. JOHNSON, OF BOSTON, MASSACHUSETTS.

SPRING-WASHER.

SPECIFICATION forming part of Letters Patent No. 330,492, dated November 17, 1885.

Application filed October 5, 1885. Serial No. 179,091. (No model.)

*To all whom it may concern:*

Be it known that I, DANIEL A. JOHNSON, of Boston, in the State of Massachusetts, have invented certain new and useful Improvements in Spring-Washers, of which the following is a specification.

My invention is directed to spring-washers designed for use more particularly as carriage-axle washers.

The washer in which my invention is comprised consists, essentially, of annular spring metal disks placed together one upon the other, and riveted or otherwise fastened one to the next at one or more points, those parts of the disk which are unriveted being bent outwardly or away from one another in such manner as to form a series of spring-leaves, which will act to hold in place the nut screwed against them. A washer of this construction is simple, easily made, and very efficient.

Figure 1:
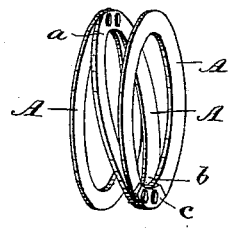
Figure 2:
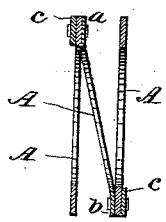
Figure 3:
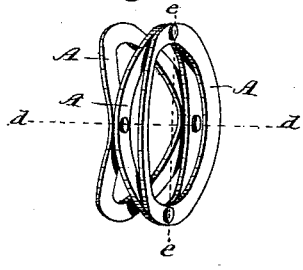

In the accompanying drawings, Figure 1 is a perspective view of a washer embodying my invention. Fig. 2 is a central cross-section of the same. Fig. 3 is a perspective view of a modified form of washer.

In the examples shown in the drawings each one of the washers is composed of three annular disks, A. They are made of spring metal of proper size for the use for which they are intended, and of such internal diameter as will permit the easy passage through them of the bolt. The disks are all of the same size and shape. They are placed one upon the other, and in the washer shown in Figs. 1 and 2 the central disk is riveted on one side or edge, $a$, to the disk below and on diametrically the opposite side or edge, $b$, to the disk above. Re-enforcing plates $c$ are used at the riveting-points to strengthen and stiffen the washer at those points. The unriveted portions of the three disks are bent outwardly or away from one another, as indicated, so that they form in effect a series of flaring spring-leaves connected together at alternately opposite ends or edges.

In the washer shown in Fig. 3 the superposed disks are riveted together on diametrical lines which are at right angles to one another—that is to say, the central disk is riveted to the one below at each edge on the diametrical line $d$ and to the one above at each edge on the diametrical line $e$ at right angles to $d$. The disks on each side of their respective lines of fastening are bent so that they will stand apart, the washer thus having six flaring leaves, which by their yielding pressure serve to hold in place the nut that bears upon them.

The washer just described has, as it will be observed, twice as many spring-leaves as the one illustrated in Figs. 1 and 2, this being due to the fact that the riveting is diametrically across each disk, instead of at one end or edge only.

In conclusion, I remark that I am aware that one or more concavo-convex or dished spring-washers have been used in conjunction with a bolt and nut, and also that a pronged disk with its prongs bent some up and some down has been used as a washer. I claim none of these things.

What I do claim as new and of my invention is—

A compound spring-metal washer consisting of a series of spring-metal annular disks riveted or fastened together at alternately opposite sides or edges, with their unriveted portions bent or inclined outwardly or away from one another in such manner as to form a series of connected spring-leaves, substantially as and for the purposes hereinbefore set forth.

In testimony whereof I have hereunto set my hand this 24th day of September, 1885.

DANIEL A. JOHNSON.

Witnesses:
ROSWELL LINSCOTT,
GRACE LINSCOTT.